(12) United States Patent
Saunders et al.

(10) Patent No.: US 7,257,120 B2
(45) Date of Patent: Aug. 14, 2007

(54) QUALITY OF SERVICE (QOS) BASED SUPERVISORY NETWORK FOR OPTICAL TRANSPORT SYSTEMS

(75) Inventors: Ross Alexander Saunders, Ottawa (CA); Vipul Rawat, Ottawa (CA); Enos Avid Lemus-Tejada, Ottawa (CA); Masood Ehsen Azad, Ottawa (CA); Ketan Bhalla, Ottawa (CA); Dan Fossum, Ottawa (CA)

(73) Assignee: Altera Corporation, San Jose, CA (US)

( * ) Notice: Subject to any disclaimer, the term of this patent is extended or adjusted under 35 U.S.C. 154(b) by 1315 days.

(21) Appl. No.: 09/976,859

(22) Filed: Oct. 12, 2001

(65) Prior Publication Data

US 2002/0097463 A1 Jul. 25, 2002

Related U.S. Application Data

(60) Provisional application No. 60/249,559, filed on Nov. 17, 2000.

(51) Int. Cl.
*H04L 12/28* (2006.01)
*H04L 12/50* (2006.01)
*H04J 3/04* (2006.01)
*H04J 14/00* (2006.01)
*H04J 14/02* (2006.01)

(52) U.S. Cl. ............ 370/395.21; 370/412; 370/535; 370/384; 398/43; 398/49; 398/83

(58) Field of Classification Search ............. 370/231, 370/395.1, 468, 390, 235, 389, 392, 396, 370/352, 395.21, 395.61, 395.4, 395.5, 466; 359/133, 389, 392, 396, 127, 395.21, 161, 359/395.4, 123, 124
See application file for complete search history.

(56) References Cited

U.S. PATENT DOCUMENTS

| 5,798,855 | A | 8/1998 | Alexander et al. |
| 6,097,699 | A * | 8/2000 | Chen et al. ............... 370/231 |
| 6,411,407 | B1 * | 6/2002 | Maxham ................... 398/173 |
| 6,433,903 | B1 * | 8/2002 | Barry et al. ................ 398/79 |
| 6,545,781 | B1 * | 4/2003 | Chang et al. ............... 398/51 |
| 6,643,290 | B1 * | 11/2003 | Glade .................... 370/395.4 |
| 6,775,268 | B1 * | 8/2004 | Wang et al. ............... 370/352 |
| 6,778,535 | B1 * | 8/2004 | Ash et al. ............ 370/395.21 |
| 6,970,451 | B1 * | 11/2005 | Greenberg et al. ......... 370/352 |
| 7,099,334 | B2 * | 8/2006 | Newell et al. .......... 370/395.5 |

OTHER PUBLICATIONS

Private Network-Network Interface Specification v1.0, af-pnno-0055.000, ATM Forum, Mar. 1996.

(Continued)

*Primary Examiner*—Hanh Nguyen
(74) *Attorney, Agent, or Firm*—Harness, Dickey & Pierce, P.L.C.

(57) ABSTRACT

Associated with an optical transport system, a packet oriented supervisory network provides differentiated classes of service (CoS) for a plurality of WDM layer applications on diverse nodes such that as soon as a higher priority application or packet arrives, the lower priority application is affected in favor of the higher one. One or more optical control channels (OSC) are used as the physical medium for implementing the packet oriented supervisory network of the invention. This new functionality of the optical control channel (OSC) enables multiple services by allowing each application to use up to 100% of the OSC bandwidth, if no other application is using it.

24 Claims, 4 Drawing Sheets

OTHER PUBLICATIONS

PNNI Augmented Routing (PAR) Version 1.0, af-ra-0104.000, ATM Forum, Jan. 1999.

Traffic Management v4.1, af-tm-0121.000, ATM Forum, Mar. 1999.

Multiprotocol Label Switching Architecture, Rosen E.C. et al., IETF draft (Jun. 2000 work progress), Jan. 2001.

MPLS Label Stack Encoding, Rosen, E.C., et al., IETF draft (Jul. 2000 work progress), Jan. 2001.

MPLS using LDP and ATM VC Switching, Davie, Bruce, et al., IETF draft (Jun. 2000 work in progress), Jan. 2001.

RSVP-TE Extensions to RSVP for LSP Tunnels, Awduche, D.O. et al., IETF draft (Aug. 2000 work in progress) Feb. 2001.

Constraint-Based LSP Setup using LDP, Jamoussi, Bilel, et al., IETF draft (Jul. 2000 work in progress) Feb. 2001.

MPLS Label Stack Encoding, draft-ietf-mpls-label-encaps-04.txt, Rosen, E.C. et al., Apr. 1999.

Use of Label Switching on Frame Relay Networks, Conta, A. et al., Jan. 2001.

* cited by examiner

QUALITY OF SERVICE (QOS) BASED SUPERVISORY NETWORK FOR OPTICAL TRANSPORT SYSTEMS

BACKGROUND OF THE INVENTION

1. Field of the Invention

The invention relates generally to fibre optic communications and more particularly relates to a supervisory network for providing differentiated services for an optical transport system.

2. Related Art

Driven by the dramatic growth rate of the Internet, the demand for the optical transport systems is increasing exponentially in bit rates and transmission distance. The expression "optical transport system", as used herein, relates to any system which uses one or more wavelengths to communicate information across an optical fiber, and uses any number of amplifiers along the fiber to boost the signals. Such optical systems include, but are not limited to, metro, long haul, and ultra long haul optical transmission systems, cable television systems, and local area networks (LANs). Optical transport systems range from low capacity 32 wavelengths, 622 Mb/s per wavelength short reach point-to-point systems, to more complex 100 wavelengths, 10 Gb/s per wavelength, 4000 Km reach systems. Several laboratory and field experiments have also demonstrated long haul optical transmission at speeds of 40 Gb/s and higher.

The nodes of an optical transport network comprise multiplexers which consolidate a plurality of information-carrying channels into a multichannel signal (or a dense wavelength division multiplexed D/WDM signal), and demultiplexers that separate the multichannel signal into its components. The transport network may also comprise electrical or optical cross-connect nodes, transmitter and receiver terminals, optical amplifier nodes, electrical regenerator nodes, and other equipment specific to the physical optical layer.

ATM (asynchronous transfer mode) is a dedicated connection switching technology, which establishes a specific path, called a switched virtual circuit (SVC), between a source and a destination node. Every ATM cell flowing from a source switch to a destination switch travels over the same SVC. Such an arrangement allows the network to establish a specific quality of service (QoS) for a specific connection, by reserving resources in advance when the SVC is created. The ATM is generally carried over WDM or SONET as the physical layer.

Packet oriented networks such as Internet, transmit packets from a source to a destination via network routers. IP is called a "connection-less" technology, because each packet of information can take a different path to reach the destination node. At the source router, the information to be transmitted (text, video, audio, etc., is divided into a number of packets, which are placed in queues and then forwarded to the destination routers. The packets travel through a number of nodes/routers and when they arrive at destination, they are assembled to produce the information that was originally transmitted. However, since they travel along diverse routes, they arrive at the destination node with different delays, and have to be re-ordered. The actual transmission delay and delay variations affect both resource capacity and resource utilization at each network element of a communication path.

A connection-less system may be unreliable due to the packet loss, reordering and duplication, which often exhaust a router and results in packets being discarded (packet loss). The IP delivery model is often referred to as a "best effort" system and an additional end-to-end protocol such as transmission control protocol (TCP) is required to provide reliability. TCP achieves this through mechanisms such as packet retransmission, which adds to the overall information transfer delay.

IP can be carried over ATM. Due to the differences between the IP and ATM, various protocols were created to transmit IP traffic over ATM networks, such as NHRP (next hop resolution protocol) and RRSP (Resource reSerVation setup protocol). IP can also be carried directly by the WDM physical layer.

Quality of Service (QoS)

One method of prioritizing traffic in a telecommunications network is to use QoS performance requirements, which refer to delay tolerances, delay variance, and data loss requirements. Applications like automatic laser safety shutdown, inter-node distributed control loops, etc., have extremely low latency and loss requirements, and therefore these applications must take high priority. Applications like remote software download, remote Telnet sessions, etc., can tolerate high latency and data loss, and therefore these applications take low priority.

It is known to insert QoS information in the header of a data unit allowing the device receiving and re-transmitting such data unit to examine the QoS portion of the header and to assign priority accordingly. The QoS allocation is typically applied in a static manner. Still, protocols like RSVP and MPLS (multi-protocol label switching) have capabilities to assess network capacities dynamically and reserve equipment resources to fulfill a specific application service requirements.

Generally, each router supports "n" priority classes of service (CoS), n>1, with "n" allocated to the lowest priority class known as "best effort", and "1" to the highest priority class known as "guaranteed delivery". The best effort model is adequate for some applications such as file transfers and e-mail. For other applications however, such as using multimedia information, the delay provided by the best effort model is unacceptable. For these applications, a method of ensuring a certain quality of service QoS, including guaranteed bandwidth, delay and packet loss is required.

A QoS manager typically controls assignment of incoming traffic to priority classes, monitors forwarding delays, and restricts admission of new traffic to compensate for states of congestion. Other QoS managers maintain separate queues for a given priority. A lower priority queue is served only after all packets in the higher priority queue have been transmitted/served.

All types of data can be characterized in terms of tolerance to data loss and delays during transmission. Latency is the delay suffered by a packed during its travel. It can be measured end-to-end (network latency), from the time when a data unit is produced at a source to the time it reaches the destination. It can also be measured from the time the packet arrives at a router until it leaves for the next hop (router/switch latency). The data flow rate is the number of data units per second that are processed by a processing node.

Without sufficient resources and proper resource management, data flows may lose their data or timelines in a random fashion, causing undesired levels of distortion for packets arriving at destination. Loss of data is the main concern and is due to excessive delays which exhaust the resources of a switch/router resulting in packets being discarded.

Supervisory Channel

The term "supervisory channel", or optical supervisory channel (OSC) as used herein, relates to a channel using a dedicated optical wavelength which runs between two nodes and is used for monitoring and control purposes within a optical transport system. There can be more than one such channels between two nodes. Bidirectional supervisory channels are also used for inter-node communication within the optical transport system, to provide access to all nodes in the system.

An example of such a supervisory channel dedicated to monitoring the system performance is disclosed in U.S. Pat. No. 5,798,855 issued on Aug. 25, 1998, to Alexander et. al. The monitoring channel of Alexander et al. operates at a wavelength outside the band of an optical amplifier in order to survive the failure of the optical amplifier.

The current transport networks have to support multiple types of applications, some which are mission critical. The current transport networks do not provide differentiated QoS for different network applications. Such mission critical applications either were not existent before, or were handled through dedicating large bandwidth, resulting in a waste of resources and increase in cost.

There is a need for a mechanism to ensure that communication among applications of an optical transport network meets the QoS objectives for efficiently utilizing the network resources.

SUMMARY OF THE INVENTION

The present invention uses a (packet oriented) control network built on top of the supervisory channels/network, for supporting differentiated CoS priority levels associated with various network internal applications, or WDM layer applications.

According to one aspect of the invention, in an optical network, a method for providing differentiated services for a plurality of WDM layer applications, is provided. The method comprises the steps of providing communication over the optical network for transmitting user traffic along a communication path; and controlling execution of the forwarding/routing function associated with a WDM layer application supporting the communication path according to a class of service (CoS) priority order at each node or network element. The step of controlling comprises connecting all network elements along the communication path over a supervisory network; transmitting control data over the supervisory network to distribute QoS instructions to each respective network element; and executing a WDM layer application at the network element to operate the network element according to the preset CoS.

According to another aspect of the invention, a method for providing differentiated services for internal applications of a transmission network, is provided. The method comprises providing communication between a source node and a destination node over a plurality of intermediate nodes and transmitting traffic along a communication path. At the source node, transmitting QoS instructions over a supervisory network, connecting the source and destination nodes over the plurality of intermediate nodes; and controlling operation of all the intermediate nodes and the destination node according to the preset said QoS instructions.

According to a still further aspect of the invention, a source node of a transport network for transmitting user data to a destination node, is provided. The source node comprises a data terminal for converting the user data into an optical transport signal and transmitting the optical signal over a transport network towards the destination node; and a supervisory channel terminal for transmitting QoS instructions associated with various network internal applications.

The present invention advantageously uses a QoS-aware (packet oriented) supervisory network to support differentiated services, by operating the WDM layer applications accordingly. The supervisory network also enables external network management applications to provision and monitor the physical DWDM/NEs and services. This supervisory network provides flexibility to the transport network as it associates stringent QoS performance requirements to high priority order applications, less stringent QoS performance requirements to medium priority applications, and low to none QoS performance requirements to low priority applications, thus accommodating a range of differentiated services.

Due to the QoS information distributed to all nodes that need to communicate through the packet oriented network, transmission delays and data loss are reduced.

Due to the fact that the traffic is handled according to its priority and associated QoS performance requirements, the invention makes efficient use of the network resources through statistically multiplexing various traffic types.

Statistical multiplexing takes advantage of the fact that common inter application packet flows are relatively bursty in nature and periods of activity are usually bracketed by variable length periods of in-activity. On a statistical basis, it is unlikely that the activity peak of every application transmitting over a given data link occurs at the same time. Thus, three inter-applications each having a peak data transmission rate of "X" can be transmitted over a link with a capacity smaller than "3X" because the transmission peaks are unlikely to coincide. Advantageously, by using statistical multiplexing transmission capacity and equipment resources are efficiently utilized.

It is to be noted that current optical networking practices explicitly reserve bandwidth for each specific application without regard to whether the bandwidth is used or not at a given instant and therefore, even when not used, the allocated bandwidth is not available to other application. In contrast, the present invention enables multiple services by allowing every application to use 100% of the OSC bandwidth, if no other application is using it. As soon as a higher priority application/packet arrives, the lower priority application is affected in favour of the higher one.

The "Summary of the Invention" does not necessarily disclose all the inventive features. The invention may reside in a sub-combination of the disclosed features.

BRIEF DESCRIPTION OF THE DRAWINGS

The invention will now be explained by way of example only and with the reference to the following drawings.

Figure 1:
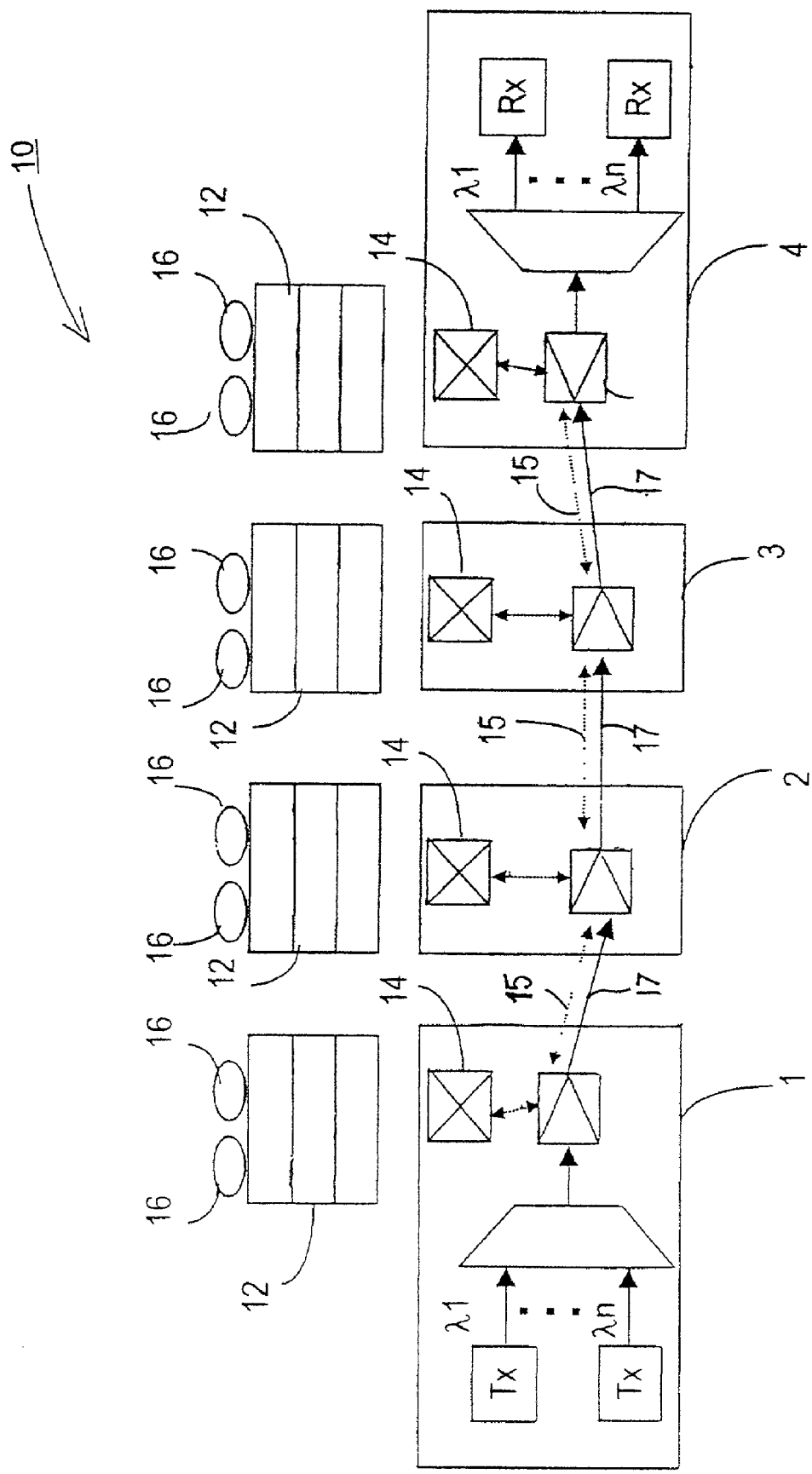
FIG. 1 is an example of an ATM control network that uses a QoS based supervisory channel as the physical medium, according to the invention.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

The optical transport network includes DWDM transport equipment and interconnecting fiber for operating at specified data rates, latency, and minimal error rate. On top of this physical network, or transport plane, a logical network, or control plane includes supervisory logical channels forming a supervisory network and connecting adjacent nodes. The physical network carries the user traffic between various user terminals connected to the edge of the network in different geographical locations as a primary service offered by the system. The packet based—supervisory network controls operation of the transport equipment by performing switching/routing of control plane traffic according to a preset CoS. Each CoS priority order implies specific QoS performance requirements and is supported by the QoS information distributed to all network elements (NE).

A typical application of the optical transport network is to provide interconnection between two SONET-compliant interfaces. The network itself knows nothing about the information being transmitted over the physical layer, i.e. voice, frame relay, ATM, IP, video, audio, etc. Payload types and QoS information are irrelevant to the system as long as the physical layer signal format complies with the transport equipment's interface.

The supervisory network is physically implemented as a small subset of the transmission network but whose use is limited to that of the DWDM network itself. Individual DWDM nodes, or node equipment (NE) communicate among themselves using the services provided by the supervisory network.

The supervisory network could be for example a packet network. The QoS-aware supervisory network of the invention enables QoS differentiated services to be offered on the supervisory channels, thus providing the "internal applications" with the service they require in a bandwidth-efficient manner. Such QoS based concept, as disclosed herein, is completely internal to the DWDM network and does not communicate in any way with external applications or equipment.

Assessing the network resources (capacity, equipment) may be performed dynamically or static. In the static priority scheme according to the invention, the QoS-based supervisory network uses a packet-oriented priority mechanism which transmits higher priority packets ahead of lower priority ones.

Table 1 shows examples of optical transport network applications having different QoS performance requirements. As shown, the applications differ from each other in terms of delay and loss requirements.

this example the supervisory network between a transmitter (Tx) node, a receiver (Rx) node, and two intermediate optical amplifiers, nodes 2 and 3. ATM switches 14, operating according to the ATM protocol stack 12 are provided at all nodes that take part in communication, including the optical amplifying nodes 2 and 3. The ATM protocol stack 12 provides, as known in the art, ATM cell adaptation for all communications that take place through the ATM network 10. Reference number 16 illustrates various WDM internal applications that can communicate through ATM network 10. These could be for example, circuit switched voice, Ethernet LAN, Internet traffic, real time and non real time video, etc.

For communication between node 1 and 4, an ATM virtual link must be established between these two nodes. A bi-directional supervisory channel 15 Is provided between all nodes, e.g. 1 to 2, 2 to 3, and 3 to 4, to carry the supervisory packets. The user traffic carrying wavelengths flows on virtual links 17, while the supervisory channel 15 distributes the QoS information to physical layer equipment along the communication path.

In this implementation, the optical supervisory channel 15 goes through optical-to-electrical-to-optical conversion at each node, while the user traffic is electrically processed to generate ATM cells at the nodes 1 and 4, in the example of FIG. 1. These cells are then queued and processed based on service categories, or other priority schemes. The cells, depending on their destination, are either switched to the next node, or sent to the user if node 4 is the destination.

The virtual path set up procedure may be manual or may use ATM/PNNI, or any other proprietary signalling and routing protocol. Each virtual path (Tx–Rx) is associated with an ATM Forum defined service category, or other priority scheme, or any combinations of these.

An ATM Forum generic function like for example Connection Admission Control (CAC), or other CAC schemes, may be used to calculate the bandwidth required for a connection, and new connections may be rejected when the required bandwidth can not be reserved without affecting the CoS priority level for the new or existing virtual paths. Other traffic engineering schemes may also be used. This, along with the service category, or priority based handling of the traffic, provides the desired class of service (CoS).

Figure 2:
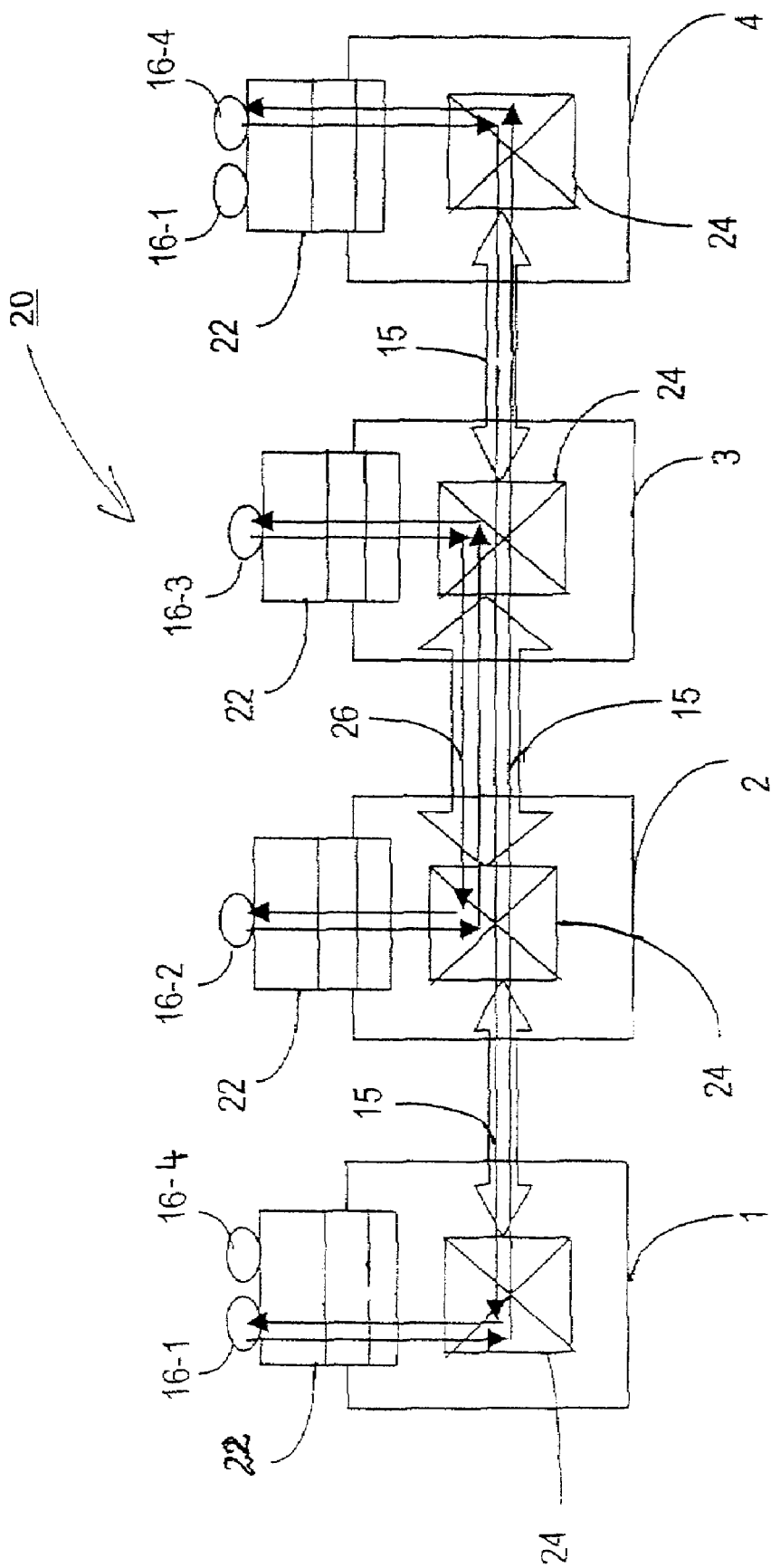
FIG. 2 is an example of applications with different QoS performance requirements communicating over supervisory channels forming a QoS based ATM supervisory network.

FIG. 2 illustrates another example of an ATM network 20 with a supervisory network comprising different supervisory channels between applications having different QoS perfor-

TABLE 1

| APPLICATION | LATENCY | LOSS | BW | PRIORITY |
| --- | --- | --- | --- | --- |
| Laser safety shutdown | Extremely low | Extremely low | Low | High |
| Distributted control loops (inter-node) | Extremely low | Extremely low | Low | High |
| Out-of-band signaling channel | Low | Extremely low | Medium | Medium |
| Alarms | Low | Low | Medium | Medium |
| Warnings | High | Medium | Medium | Low |
| Provisioning/Configuration requests | Medium | Low | Low | Medium |
| Performance monitoring & control | Medium | Low | Medium | Medium |
| Orderwire | Low | Medium | Medium | Low |
| Ethernet LAN connection | High | High | High | Low |
| Remote software download | High | High | High | Low |

FIG. 1 is an example of an ATM network 10 that uses a QoS based supervisory channel as the physical medium, according to the invention. The ATM network 10 shows in mance requirements. Standard ATM service categories, or proprietary priority schemes, or any combinations of these may be used to provide a range of CoS priority levels to various applications. Traffic is mapped to a service category (a priority), and is routed, switched, or forwarded based on its priority.

The following ATM Forum service categories are listed according to their priority: constant bit rate (CBR), real time variable bit rate (rtVBR), non real time VBR (nrtVBR), available bit rate (ABR), and unspecified bit rate (UBR).

CBR has the highest priority as it is designed for low delay, delay variance, and loss of sensitive data. CBR traffic needs a predictable, substantially constant bit rate, and is delay and jitter intolerant. For example, during setup of a CBR connection, a peak cell rate (PCR) is negotiated to define the maximum rate at which data can be transported without significant risk of cell loss.

TABLE 2

| APPLICATION | LATENCY | LOSS | BW | PRIORITY | ATM Forum service categories |
|---|---|---|---|---|---|
| Laser safety shutdown | Extremely low | Extremely low | Low | High | CBR |
| Distributted control loops (inter-node) | Extremely low | Extremely low | Low | High | CBR |
| Out-of-band signaling channel | Low | Extremely low | Medium | Medium | rtVBR |
| Alarms | Low | Low | Medium | Medium | ntrVBR |
| Warnings | High | Medium | Medium | Low | UBR |
| Provisioning/Configuration requests | Medium | Low | Low | Medium | ntrVBR |
| Performance monitoring & control | Medium | Low | Medium | Medium | ntrVBR |
| Orderwire | Low | Medium | Medium | Low | ABR |
| Ethernet LAN connection | High | High | High | Low | UBR |
| Remote software download | High | High | High | Low | UBR |

VBR requires that for each connection the followings are negotiated during connection setup: a PCR, a sustained cell rate (SCR), and a jitter tolerance value. The SCR represents an upper bound for the average throughput over the connection. A burst tolerance parameter defines how long a VBR connection will be allowed to accept traffic greater than SCR before the traffic rate is reduced below SCR to maintain an overall throughput not exceeding the SCR.

Table 2 shows an example of possible mappings of Table 1 applications QoS performance requirements to ATM Forum service categories. As shown, CBR and rtVBR correspond to high priority, nrtVBR to medium priority, and ABR, UBR to low priority applications (also viewed as a best effort).

Returning to FIG. 2, supervisory channels 15 are acting as the physical medium for connecting nodes 1, 2, 3, 4, and inter-node applications 16. For example, supervisory channels 15 are connecting applications 16-1 and 16-4 having ABR service category (priority) through an Ethernet LAN connection, while supervisory channel 26 connects a real time inter-node control loop applications 16-2 and 16-3. ATM switches 24 perform VPI\NCI switching at each node. An ATM protocol stack 22 is provided on top of each ATM enabled node.

The QoS based supervisory network is independent of the number of supervisory channels 15 used and how they are connected to different nodes, as long as each node within the ATM optical transport network 20, that needs to communicate through the packet network, is connected through at least one supervisory channel 15.

A MPLS network is Layer-2 and Layer-3 protocol independent, and therefore may be implemented over a variety of protocols like IP, ATM, frame relay, point-to-point protocol (PPP), etc.

MPLS is an Internet Engineering Task Force (IETF) specified framework that supports a range of QoS objectives through different forward equivalence classes (FEC). The traffic is routed/switched/forwarded based on FEC allocated values. It is to be noted that FEC is analogous to a service category (priority) of the ATM network.

MPLS uses the concept of labels for packet switching. A label always identifies its FEC value. These labels are the underlying protocol-specific identifiers. For example, in case of MPLS over ATM, the label may be the virtual path identifier (VPI), the virtual channel identifier (VCI), or a combination of these; in case of frame relay, the label is the data link connection identifier (DLCI); in IP, the MPLS label is just called "a label"; in point to point (PPP) the label is the shim header.

In a MPLS environment, at each node a packet is forwarded, or switched based on its incoming label. The MPLS network will use either hop-by-hop, or explicit/constraint routing (CR), or their combinations thereof for an end-to-end label switched path (LSP) selection. A LSP (label switching protocol) is a sequence of labels at each node along the path between the source and destination. Hop-by-hop routing allows each node to independently choose the next hop for each FEC value, while in explicit routing, the entire LSP is pre-specified by ingress or egress nodes, or by other means. For an IP network, explicit routed LSPs can be established manually, or by using underlying protocol specific routing and signalling, e.g., PNNI in case of ATM and (RSVP), etc.

During the LSP set up, the MPLS network uses different resource reservation schemes to allocate resources like bandwidth, queue buffers, etc. to ensure the desired CoS priority level is met. At each intermediate node, an incoming label is mapped, queued, forwarded, or switched according to its FEC priority. In combination with a proper resource reservation assignment, the required QoS objectives are achieved based on traffic's FEC priority.

A FEC code may be assigned to one application, or to a group of applications. An example of such mapping is shown in Table 3 for the same exemplary applications as in Table 1. Table 3 shows the optical transport network QoS performance requirements and corresponding MPLS/FEC mappings. In this example, the FEC priorities are shown in decreasing order from 1 to 7.

TABLE 3

| APPLICATION | LATENCY | LOSS | BW | PRIORITY | MPLS FEC |
|---|---|---|---|---|---|
| Laser safety shutdown | Extremely low | Extremely low | Low | High | 1 |
| Distributted contol loops (inter-node) | Extemely low | Extremely low | Low | High | 1 |
| Out-of-band signaling channel | Low | Extremely low | Medium | Medium | 2 |
| Alarms | Low | Low | Medium | Medium | 3 |
| Warnings | High | Medium | Medium | Low | 6 |
| Provisioning/Configuration on requests | Medium | Low | Low | Medium | 4 |
| Performance monitoring & control | Medium | Low | Medium | Medium | 5 |
| Orderwire | Low | Medium | Medium | Low | 6 |
| Ethernet LAN connection | High | High | High | Low | 7 |
| Remote software download | High | High | High | Low | 7 |

Figure 3:
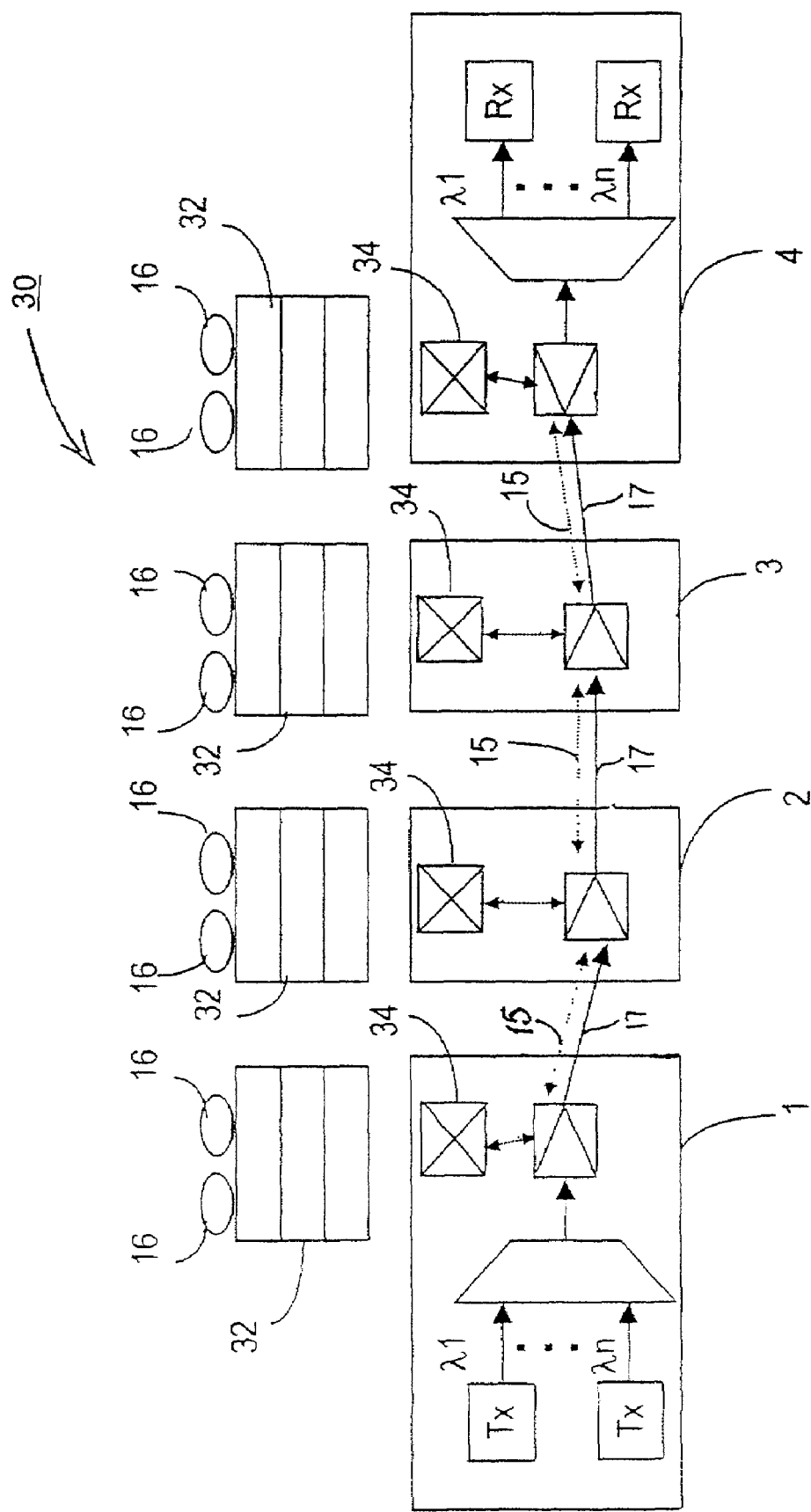
FIG. 3 is an example of QoS based MPLS-IP supervisory network.

FIG. 3 is an example of a MPLS-IP control network using supervisory channels 15 as the physical medium for implementing a QoS based MPLS-IP network 30. Label switches 34 are provided at each node for routing the user traffic on links 17.

The MPLS-IP network 30 has an MPLS and IP protocol stack 32 at each node that takes part in communication. Explicit LSPs can be set manually or dynamically. Label switching is done at each node. For a dynamic LSP setup, protocols like RSVP, or CR-LDP may be also considered for resource reservation and label distribution.

A QoS based MPLS over ATM supervisory network is the same as, or similar to the one described above, however the adaptation entity at each ATM node also maps each MPLS/FEC to one ATM service category (one priority). For a dynamic LSP set up, the ATM network may also use the MPLS signalling and routing protocol instead of PNNI.

The MPLS over ATM network may use ATM/CAC procedures. In the case of IP, this may be done using RSVP, or a constrained routing label distribution protocol (CR-LDP), or other protocols.

It is to be noted that an ATM switch or an IP router may be either separate pieces of equipment interconnecting entities of the optical supervisory channel (OSC), or components of the DWDM equipment itself, e.g. a separate circuit card. The operation of the ATM switch or the IP router is controlled through QoS instructions for performing a priority based packet queuing scheme.

The optical transport network may also be a packet-oriented network, again using bidirectional OSC as the physical layer for the supervisory network. Also, the supervisory network may be in another embodiment, a mechanism for implementing a QoS oriented DiffServ IP supervisory network. In DiffServ, the QoS priority level is provided through different classes of service (CoS), or code points (DSCP). Packets are processed according to their QoS performance requirements.

A QoS based DiffServ IP supervisory network has IP routing capability at all nodes that take part in communication. Applications that reside in these nodes, determine the QoS performance requirements for the outgoing packets, and the IP stack software stamps the packets with the corresponding DiffServ code point (DSCP). These packets are queued and routed hop-by-hop according to their DSCP at each node. A simple example of the class of service CoS/QoS based implementation is shown below:

Class A Service: 11xxx
Class B Service: 10xxx
Class C Service: 01xxx
Class D Service: 00xxx Within these coarse-grained CoS levels, there can be multiple ($2^4$=64) CoS priority levels.

TABLE 4

| APPLICATION | LATENCY | LOSS | BW | PRI. | DSCP | TCB |
|---|---|---|---|---|---|---|
| Laser safety shutdown | Extremely low | Extremely low | Low | High | 110001 | No Discard |
| Distributted control loops (inter-node) | Extremely low | Extremely low | Low | High | 110010 | No Discard |
| Out-of-band signaling channel | Low | Extremely low | Medium | Medium | 100001 | Shape to profile, tail drop when full |
| Alarms | Low | Low | Medium | Medium | 010001 | Tail drop when full |
| Warnings | High | Medium | Medium | Low | 000010 | Apply WRED dropping |
| Provisioning/Configuration requests | Medium | Low | Low | Medium | 010011 | Tail drop when full |
| Performance monitoring & control | Medium | Low | Medium | Medium | 010100 | Tail drop when full |

TABLE 4-continued

| APPLICATION | LATENCY | LOSS | BW | PRI. | DSCP | TCB |
|---|---|---|---|---|---|---|
| Orderwire | Low | Medium | Medium | Low | 010100 | Apply WRED dropping |
| Ethernet LAN connection | High | High | High | Low | 010101 | Apply WRED dropping |
| Remote software download | High | High | High | Low | 010111 | Apply WRED dropping |

Table 4, presents an example of DSCP mappings to various applications. These CoS priority levels, with the associated DSCPs can be treated against defined traffic conditioning blocks (TCB).

A DiffServ enabled router resides in one or more cards on each of the nodes, acting as a router for the cards in the within the node. In terms of the router components, the DiffServ agent will reside on the control plane. There is no data plane DiffServ components. A network management (software) entity is responsible for managing the traffic policy. The traffic policy can be used to shape, police, filter packets that travel through the router core. A per-hop-behaviour (PHB) can be defined for each CoS priority level by taking in to account latency, bandwidth, the traffic shaping algorithm to be applied, etc.

The CoS priority levels will cater for QoS performance requirements of all communication internal to the optical transport network, as well as communication between nodes and the equipment external to the optical transport network.

Again, the packet network architecture here is independent of the supervisory network architecture, except that the supervisory network must connect all nodes that need to take part in the packet based communication.

The supervisory network of the invention may also use ATM, MPLS, DiffServ protocols as further implementations for providing QoS differentiated services. Various implementations of MPLS based networks, such as MPLS over ATM, MPLS-IP, MPLS-PPP, MPLS over frame relay, are also contemplated.

Figure 4:
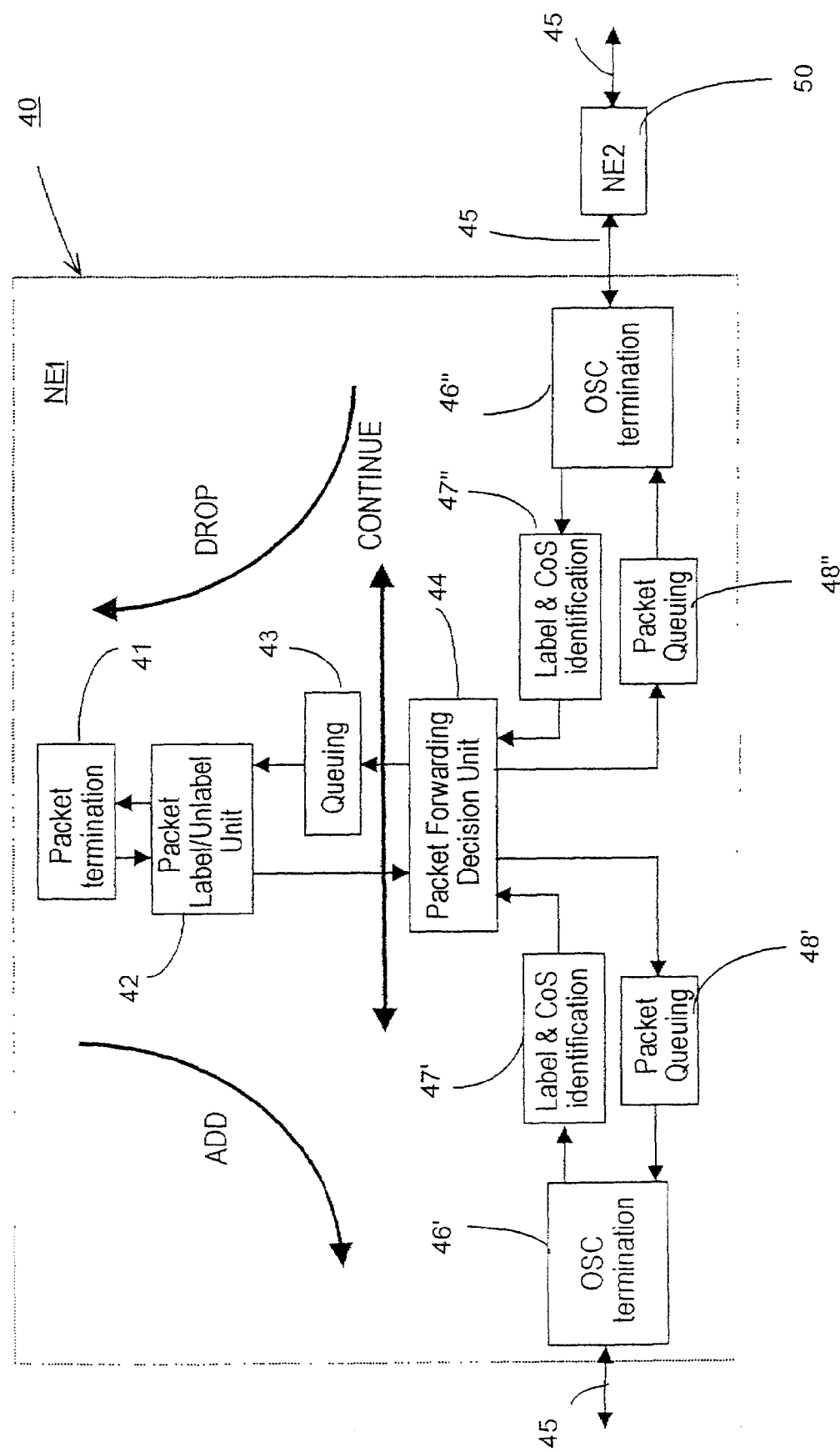
FIG. 4 is a block diagram of a QoS enabled OSC apparatus according to the invention.

FIG. 4 is a block diagram illustrating a QoS enabled OSC apparatus according to the invention. The packet flow in this case is the control traffic containing control data. At each optical network element (NE) 40, 50, may be classified as belonging to and 'add' path, 'drop' path, or a 'continue' path.

For the 'add' path, or the east-west direction shown by arrow, the packets are sourced at NE 40 for various destinations. A supervisory packet generated at the packet termination entity 41 is labelled by unit 42 according to the type of forwarding decision used by the system and an internal class of service (Cos) is assigned. The packet forwarding decision unit 44 determines the outgoing port according to a standard protocol, i.e. IP address, ATM VCI, MPLS LSP, etc. The packet is enqueued in block 48' according to its assigned CoS priority level, such that higher priority traffic is transmitted first. Finally, the packet is delivered to OSC termination entity 46' and transmitted over OSC 45.

The packets in the 'drop' path for the east-west direction are destined to NE 40, or another destination via NE 40. A supervisory packet received for example from NE2, over OSC 45 at OSC termination entity 46" is recognized/identified in label identification block 47" and treated according to the associated forwarding decision. The packet forwarding decision unit 44 determines the outgoing port according to a standard protocol, i.e. IP address, ATM VCI, MPLS LSP, etc. The packet is enqueued according to identified priority order (associated with the desired CoS) in packet queuing block 43. The label is then removed from the packet in packet label/unlabel block 42 and packet termination entity 41 delivers the packet to the respective application at NE 40 or the packet is forwarded elsewhere along a non-OSC path.

Packets travelling in the CONTINUE path traverse NE 40 over OSC 45 en route to their final destination. A packet received over OSC 45 at OSC termination entity 46" is recognized/identified in label identification block 47", the appropriate forwarding decision is invoked, and delivered to the packet forwarding decision unit 44. The packet forwarding decision unit 44 determines the outgoing port according to a standard protocol, i.e. IP address, ATM VCI, MPLS LSP, etc. The packet is enqueued according to the associated priority order (associated with the desired CoS) in packet queuing block 48'. Finally, the packet is forwarded to the OSC termination entity 46' and transmitted over OSC 45 to continue its path to a peer NE.

A mechanism for implementing a QoS oriented packet based network that uses an optical supervisory channel as the physical medium, was presented. This (packet oriented) supervisory network handles differentiated CoS priority levels for communication among internal applications on diverse nodes. The CoS levels, supported by the QoS instructions distributed to all the network elements (NE), are associated with all communications internal to the optical transport network, and the communication between nodes in the optical network as well as the equipment external to the optical transport network. The (packet oriented) supervisory network architecture is independent of the supervisory channel architecture, except that the supervisory channels must connect all nodes that need to take part in the packet based communication. It is evident, a central entity can provide the management task for all the nodes connected through the supervisory network.

The new functionality of the control channels is in addition to the monitoring and control functions typically associated with control channels. It is understood that any traffic category i.e. signalling information, user's data, may be transmitted over the supervisory network in accordance with a desired CoS.

Examples of "packet based networks" performing as "a QoS oriented packet based network" include Asynchronous Transfer Mode (ATM), variants of Multi-Protocol Label Switching (MPLS), and DiffServ based IP networks.

ATM and MPLS are well known standards and the ATM and MPLS network form a significant portion of the public data networks. ATM, Internet Protocol (IP), MPLS, and other standard or proprietary protocols can be used as a choice for the above packet based networks.

Numerous modifications, variations, and adaptations may be made to the particular embodiments of the invention without departing from the scope of the invention which is defined in the claims.

We claim:

1. In an optical network, a method for providing differentiated services for a plurality of WDM layer applications, comprising:

transmitting user traffic over a range of wavelengths along a communication path in an optical network;

connecting network elements along the communication path via an optical supervisory channel, the supervisory channel being transmitted at a wavelength different than the range of wavelengths being used to transmit the user traffic;

transmitting control data for supporting a class of service (CoS) over the supervisory channel to each respective network elements, wherein said control data comprises protocol data units (PDU) transported over said supervisory network; and executing a WDM layer application at each of the network elements to operate the network element according to the control data, wherein said step of transmitting control data comprises:

at a first network element,
generating an add supervisory PDU comprising CoS information destined to said WDM layer application operating at a second network element;
providing said add supervisory PDU with an identification tag;
forwarding said add supervisory PDU to an appropriate output port queue;
queuing said add supervisory PDU according to said CoS information; and
routing a plurality of said add supervisory PDU from different queues over said supervisory network according to said CoS.

2. A method as claimed in claim 1, wherein said control data provide one or more operating parameters of said WDM layer application.

3. A method as claimed in claim 2, wherein said operating parameter is the internal priority level associated with said WDM layer application.

4. A method as claimed in claim 2, wherein said operating parameter is the latency level for said WDM layer application.

5. A method as claimed in claim 2, wherein said operating parameter is the acceptable loss level for said WDM layer application.

6. A method as claimed in claim 2, wherein said operating parameter is the bandwidth for said WDM layer application.

7. A method as claimed in claim 1, wherein said WDM layer application is one or more application selected from the network internal applications including: laser safety shutdown, distributed internode control loops, out-of-band signalling channel, alarms, warnings, provision/configuration request, performance monitoring control, orderwire, and remote software download.

8. A method as claimed in claim 1, wherein said step of transmitting control data comprises:

at a first network element,
a) receiving a drop supervisory PDU comprising CoS information;
b) determining from an identification tag that said drop supervisory PDU is destined to said first network element;
c) extracting said CoS information from said drop supervisory PDU; and
d) executing said WDM layer application according to said CoS information.

9. A method as claimed in claim 1, wherein said step of transmitting control data comprises:

at a first network element,
a) receiving a continue supervisory PDU comprising CoS information;
b) determining from an identification tag that said supervisory PDU is destined to a second network element of said communication path; and
c) transmitting said supervisory PDU over said supervisory network.

10. A method as claimed in claim 9, wherein step (c) comprises:

extracting said CoS information from said continue supervisory PDU;
forwarding said continue supervisory PDU to an appropriate output port queue;
queuing said continue supervisory PDU according to said CoS information; and
transmitting a plurality of said continue supervisory PDU from different queues according to said Cos.

11. In an optical network, a method for providing differentiated services for a plurality of WDM layer applications, comprising:

transmitting user traffic over a range of wavelengths along a communication path in an optical network;

connecting network elements along the communication path via an optical supervisory channel, the supervisory channel being transmitted at a wavelength different than the range of wavelengths being used to transmit the user traffic;

transmitting control data for supporting a class of service (CoS) over the supervisory channel to each respective network elements, wherein said control data comprises protocol data units (PDU) transported over said supervisory network; and executing a WDM layer application at each of the network elements to operate the network element according to the control data, wherein said step of transmitting control data comprises:

at a first network element,
receiving a drop supervisory PDU comprising CoS information;
determining from an identification tag that said drop supervisory PDU is destined to said first network element;
extracting said CoS information from said drop supervisory PDU; and
executing said WDM layer application according to said CoS information.

12. A method as claimed in claim 11 wherein said control data provide one or more operating parameters of said WDM layer application.

13. A method as claimed in claim 12, wherein said operating parameter is the internal priority level associated with said WDM layer application.

14. A method as claimed in claim 12, wherein said operating parameter is the latency level for said WDM layer application.

15. A method as claimed in claim 12, wherein said operating parameter is the acceptable loss level for said WDM layer application.

16. A method as claimed in claim 12, wherein said operating parameter is the bandwidth for said WDM layer application.

17. A method as claimed in claim 11, wherein said WDM layer application is one or more application selected from the network internal applications including: laser safety shutdown, distributed internode control loops, out-of-band signalling channel, alarms, warnings, provision/configuration request, performance monitoring control, orderwire, and remote software download.

18. In an optical network, a method for providing differentiated services for a plurality of WDM layer applications, comprising:
   transmitting user traffic over a range of wavelengths along a communication path in an optical network;
   connecting network elements along the communication path via an optical supervisory channel, the supervisory channel being transmitted at a wavelength different than the range of wavelengths being used to transmit the user traffic;
   transmitting control data for supporting a class of service (CoS) over the supervisory channel to each respective network elements, wherein said control data comprises protocol data units (PDU) transported over said supervisory network; and
   executing a WDM layer application at each of the network elements to operate the network element according to the control data, wherein said step of transmitting control data comprises
      at a first network element,
         receiving a continue supervisory PDU comprising CoS information;
         determining from an identification tag that said supervisory PDU is destined to a second network element of said communication path; and
         transmitting said supervisory PDU over said supervisory network.

19. A method as claimed in claim 18, wherein said control data provide one or more operating parameters of said WDM layer application.

20. A method as claimed in claim 19, wherein said operating parameter is the internal priority level associated with said WDM layer application.

21. A method as claimed in claim 19, wherein said operating parameter is the latency level for said WDM layer application.

22. A method as claimed in claim 19, wherein said operating parameter is the acceptable loss level for said WDM layer application.

23. A method as claimed in claim 19, wherein said operating parameter is the bandwidth for said WDM layer application.

24. A method as claimed in claim 18, wherein said WDM layer application is one or more application selected from the network internal applications including: laser safety shutdown, distributed internode control loops, out-of-band signalling channel, alarms, warnings, provision/configuration request, performance monitoring control, orderwire, and remote software download.

* * * * *